(12) United States Patent
Quaid

(10) Patent No.: US 11,971,086 B2
(45) Date of Patent: Apr. 30, 2024

(54) CABLE TENSIONER

(71) Applicant: Vivero One Research, LLC, Hollywood, FL (US)

(72) Inventor: Arthur Quaid, Hollywood, FL (US)

(73) Assignee: Vivero One Research, LLC, Hollywood, FL (US)

( * ) Notice: Subject to any disclaimer, the term of this patent is extended or adjusted under 35 U.S.C. 154(b) by 236 days.

(21) Appl. No.: 17/506,793

(22) Filed: Oct. 21, 2021

(65) Prior Publication Data

US 2023/0130062 A1    Apr. 27, 2023

(51) Int. Cl.
*B25J 9/10* (2006.01)
*F16H 21/44* (2006.01)

(52) U.S. Cl.
CPC ............ *F16H 21/44* (2013.01); *B25J 9/1045* (2013.01)

(58) Field of Classification Search
CPC .......... B25J 9/1045; F16H 21/44; G01L 5/06
See application file for complete search history.

(56) References Cited

U.S. PATENT DOCUMENTS

| | | | |
|---|---|---|---|
| 4,362,062 A * | 12/1982 | Peterson ................. | G01L 5/06 73/862.472 |
| 5,046,375 A | 9/1991 | Salisbury, Jr. et al. | |
| 5,682,795 A * | 11/1997 | Solomon ............... | B25J 9/1045 474/271 |
| 6,668,678 B1 * | 12/2003 | Baba ..................... | B25J 13/02 901/21 |
| 6,985,133 B1 | 1/2006 | Rodomista et al. | |
| 8,347,755 B2 | 1/2013 | Bennett et al. | |
| 8,347,756 B2 | 1/2013 | Bennett et al. | |
| 8,464,603 B2 | 6/2013 | Quaid | |
| 8,931,359 B2 | 1/2015 | Quaid | |
| 2018/0125595 A1 * | 5/2018 | Yoshii .................. | A61B 34/71 |

OTHER PUBLICATIONS

A. E. Quaid, "A modular actuator with translational motion along an arc," 2013 IEEE/RSJ International Conference on Intelligent Robots and Systems, 2013, pp. 4912-4918, doi: 10.1109/IROS.2013.6697065.
Rejendra Karwa, "A Text Book of Machine Design," p. 257, Section B: Translation or Power Screws, Firewall Media, 2002.

* cited by examiner

*Primary Examiner* — Ernesto A Suarez
*Assistant Examiner* — Gregory T Prather
(74) *Attorney, Agent, or Firm* — Bell & Manning, LLC

(57) ABSTRACT

An actuator includes a motor, a shaft, an actuator body, a first tension element, a cable tensioner, and a tension gauge. The shaft is mounted to the motor. The actuator body includes a first anchor body and a second anchor body. The first tension element is mounted to encircle the shaft and includes a first end and a second end. The first end of the first tension element is mounted to the first anchor body of the actuator body. The cable tensioner is mounted to the second anchor body of the actuator body and includes a tension adjuster, a second tension element, and a tension element terminator. The second tension element is mounted to the tension adjuster. The second end of the first tension element is mounted to the second tension element. The tension gauge is mounted adjacent the tension adjuster to indicate a tension of the second tension element.

20 Claims, 14 Drawing Sheets

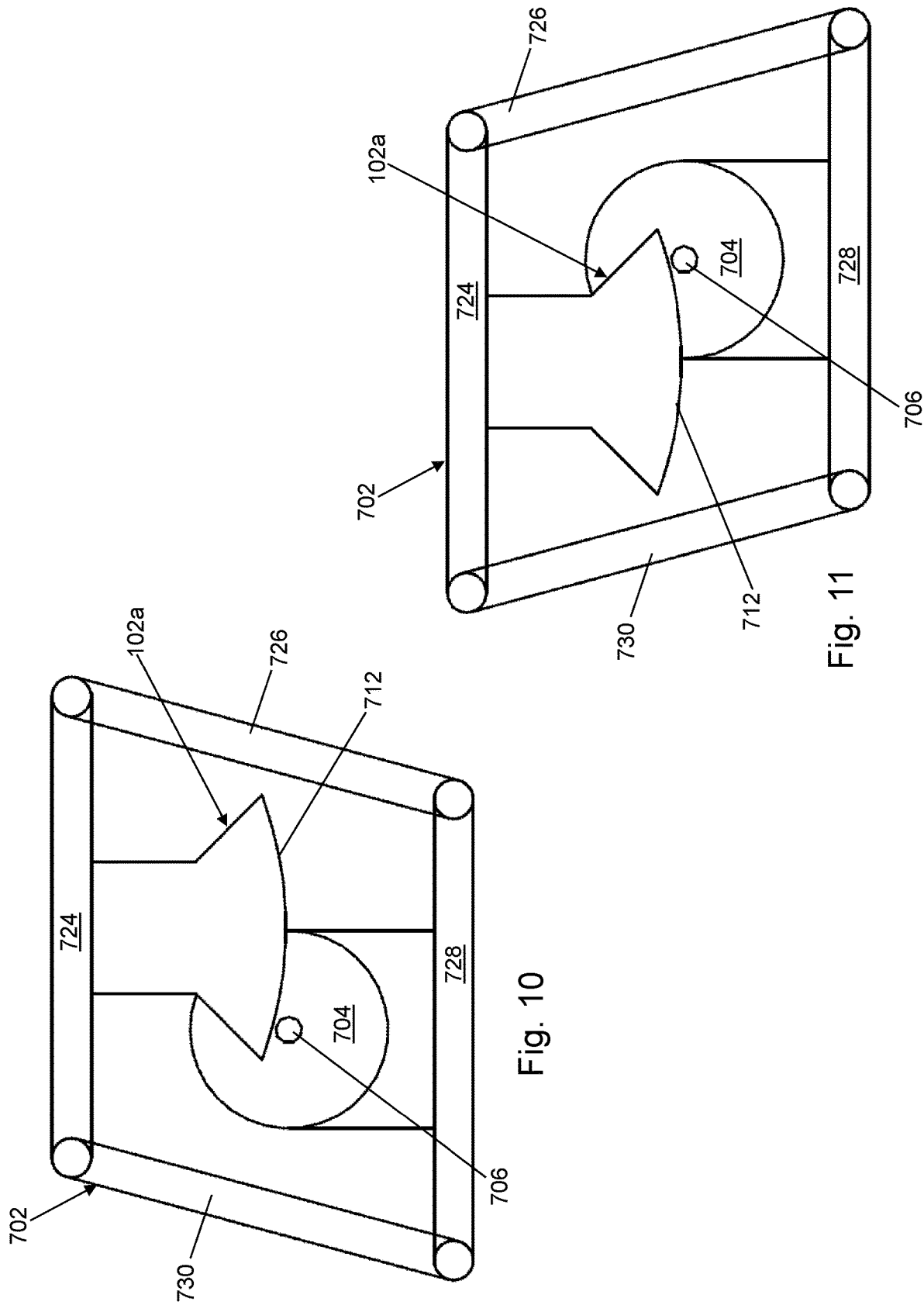

CABLE TENSIONER

BACKGROUND

Many devices that use a cable use a mechanism to set a tension on the cable for a proper operation of the device. For example, a driven element of the device may be moved based on movement of the cable, and a proper tension is needed to control a precise movement and to avoid slippage while also avoiding unnecessary wear on the cable.

SUMMARY

In an example embodiment, an actuator is provided. The actuator includes, but is not limited to, a motor, a shaft, an actuator body, a first tension element, a cable tensioner, and a tension gauge. The shaft is mounted to the motor for rotation under control of the motor. The actuator body includes, but is not limited to, a first anchor body and a second anchor body. The first tension element is mounted to encircle the shaft and includes, but is not limited to, a first end and a second end. The second end is opposite the first end. The first end of the first tension element is mounted to the first anchor body of the actuator body. The cable tensioner is mounted to the second anchor body of the actuator body and includes, but is not limited to, a tension adjuster, a second tension element, and a tension element terminator. The second tension element is mounted to the tension adjuster and includes, but is not limited to, a third end and a fourth end. The fourth end is opposite the third end. The second end of the first tension element is mounted to the second tension element. The tension gauge is mounted adjacent the tension adjuster to indicate a tension of the second tension element.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 10 depicts a front view of a simplified actuator showing a translating link of the actuator translated to the right in accordance with an illustrative embodiment.

FIG. 11 depicts a front view of the simplified actuator of FIG. 10 showing the translating link of the actuator translated to the left in accordance with an illustrative embodiment.

DETAILED DESCRIPTION

Figure 1:
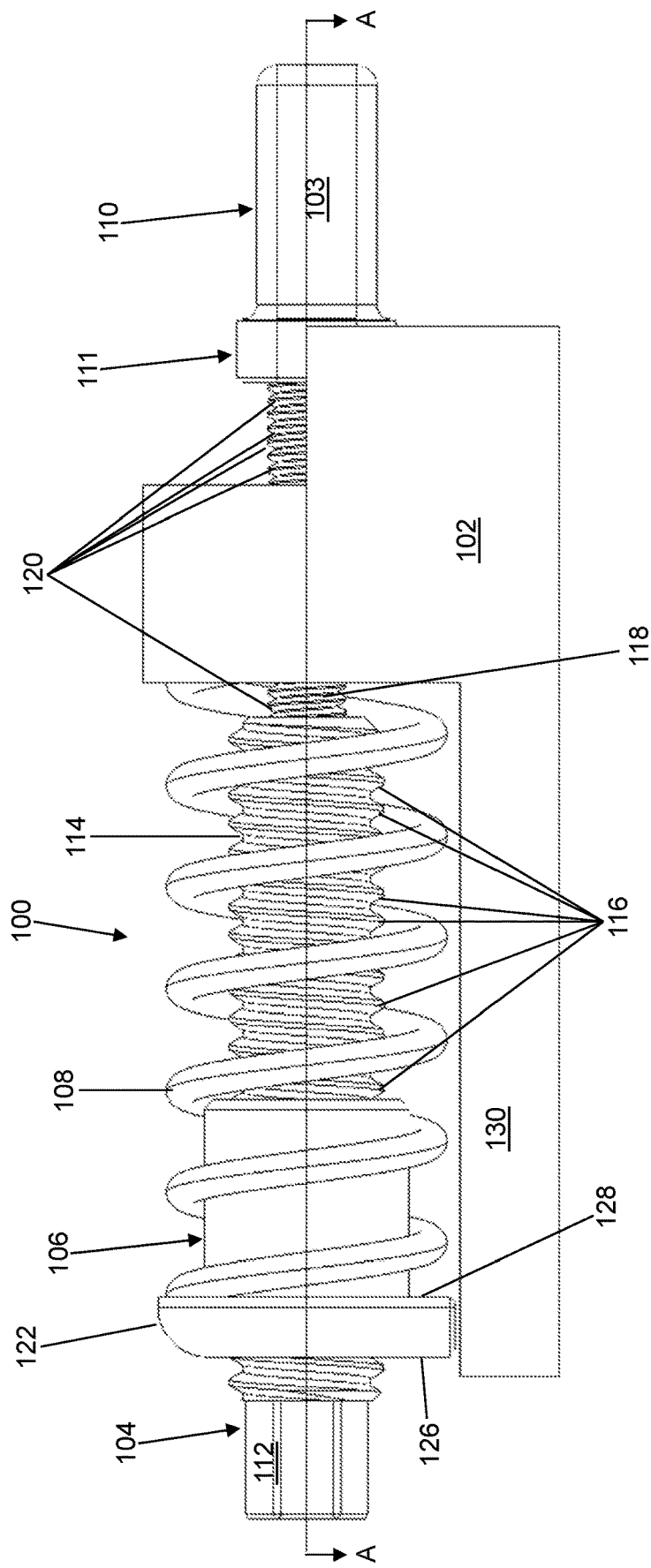
FIG. 1 depicts a front view of a cable tensioner with a cable terminator mounted to an actuator body in accordance with an illustrative embodiment.
Figure 2:
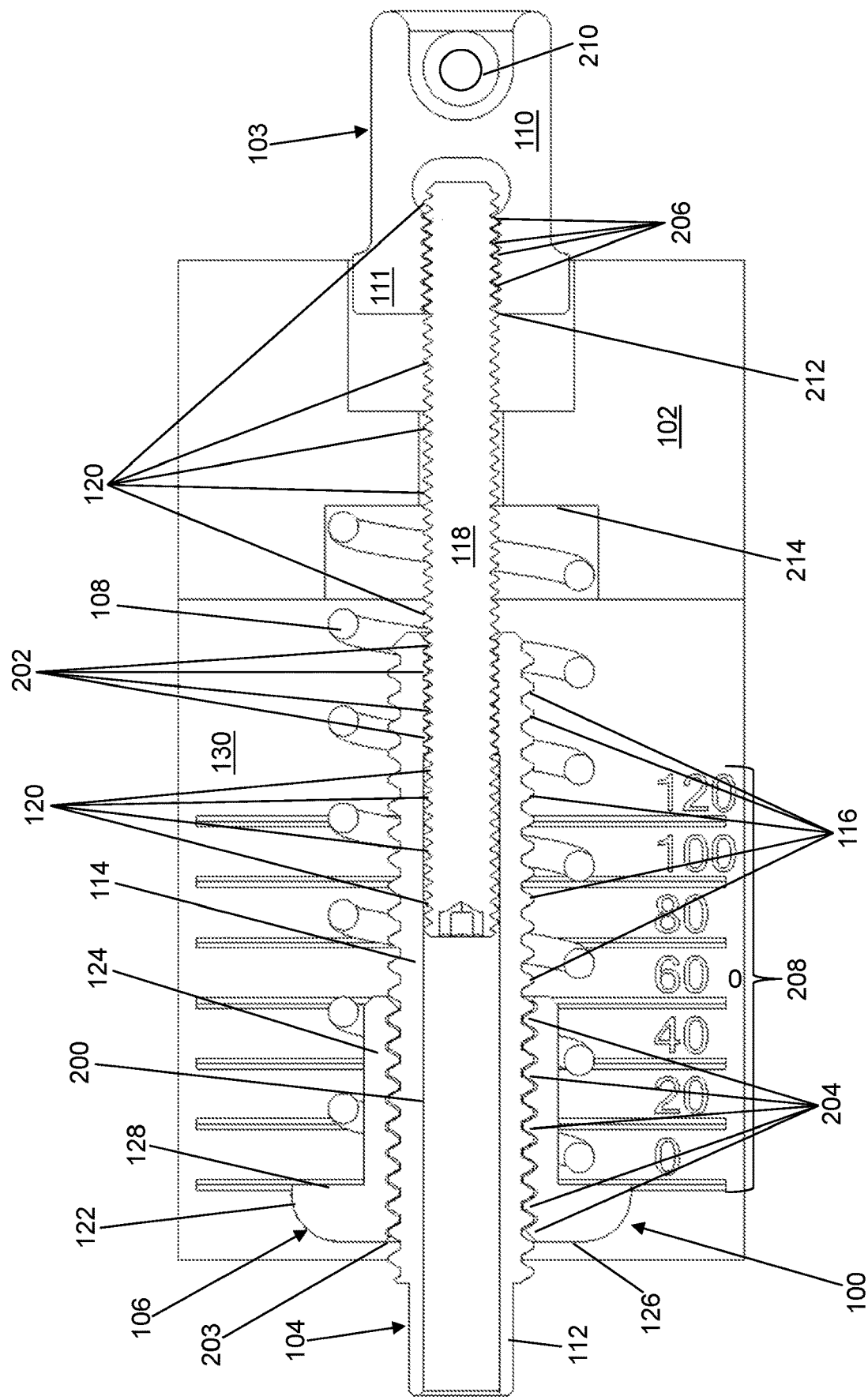
FIG. 2 depicts a top cross-sectional view of the cable tensioner of FIG. 1 in accordance with an illustrative embodiment.
Figure 3:
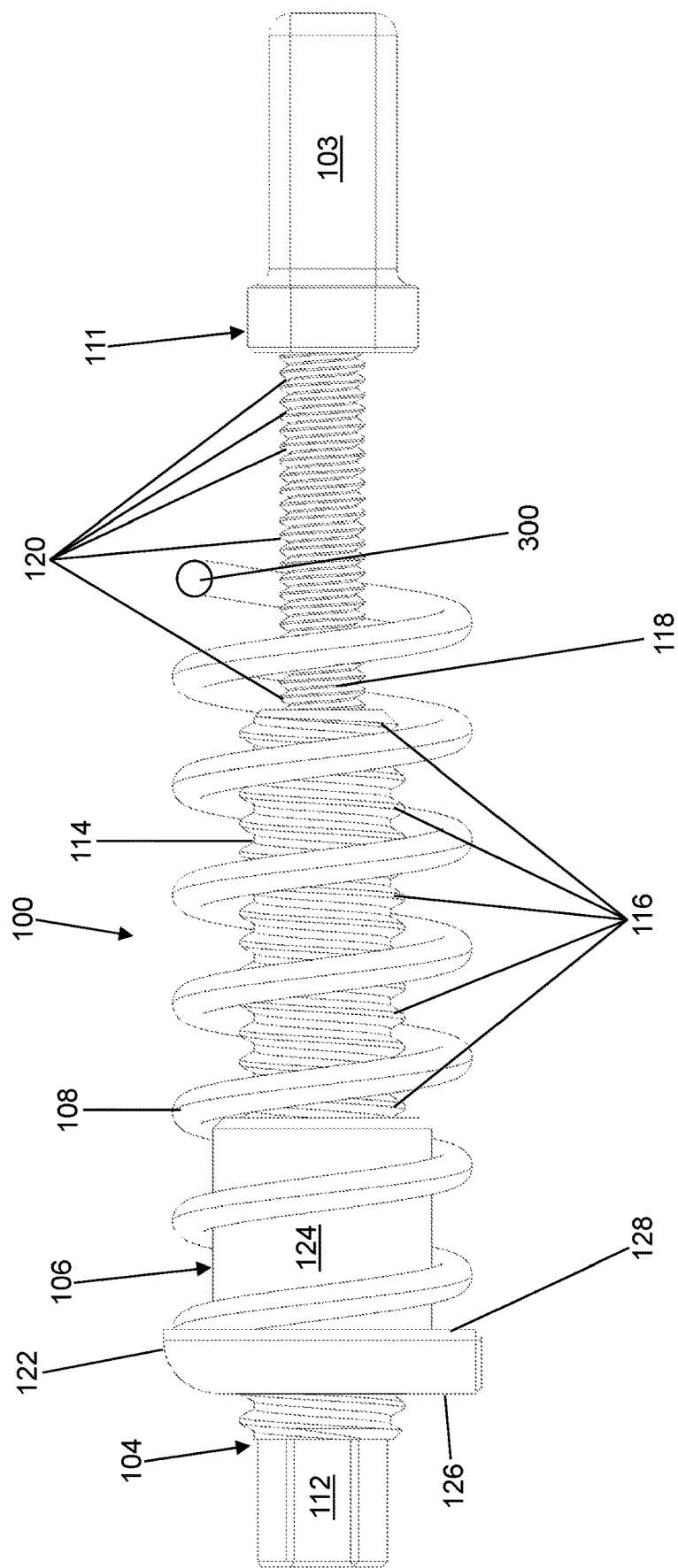
FIG. 3 depicts a front view of the cable tensioner of FIG. 1 without the actuator body in accordance with an illustrative embodiment.
Figure 4:
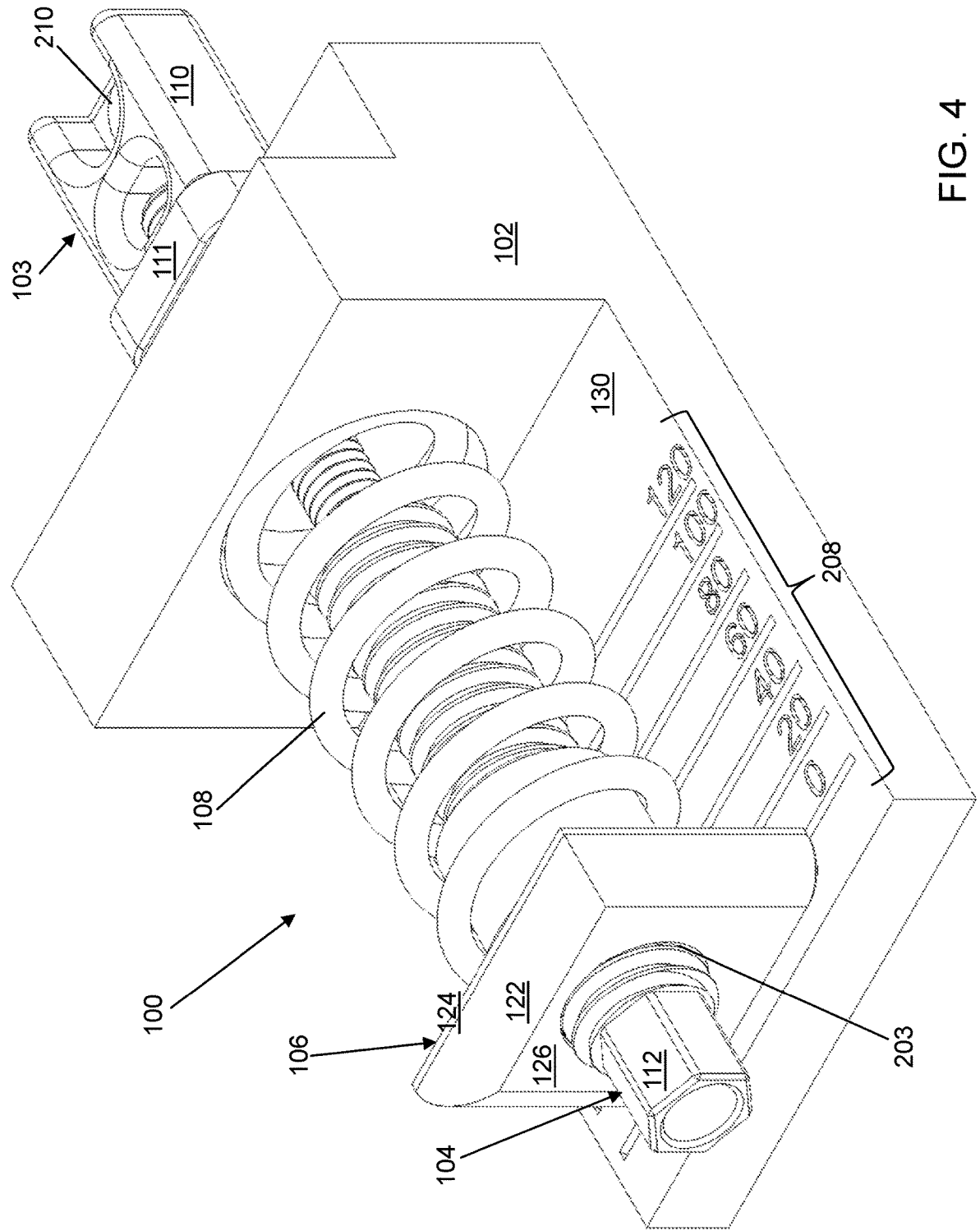
FIG. 4 depicts a left, front perspective view of the cable tensioner of FIG. 1 in accordance with an illustrative embodiment.
Figure 5:
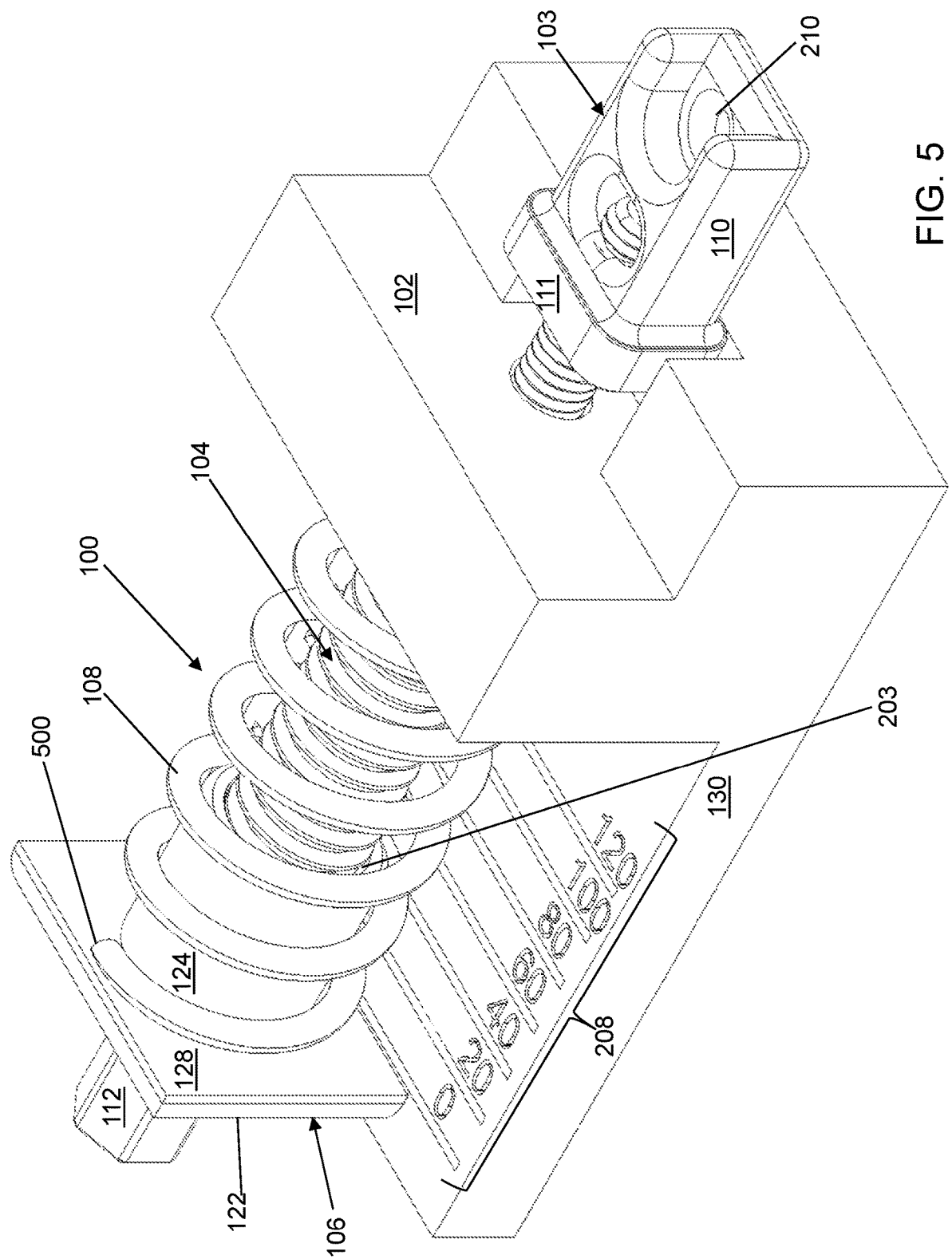
FIG. 5 depicts a right, front perspective view of the cable tensioner of FIG. 1 in accordance with an illustrative embodiment.

Referring to FIG. 1, a front view of a cable tensioner 100 mounted to an actuator body 102 is shown in accordance with an illustrative embodiment. Referring to FIG. 2, a top cross-sectional view of cable tensioner 100 is shown in accordance with an illustrative embodiment. The top cross-sectional view of cable tensioner 100 is along a plane A-A shown with reference to FIG. 1. Referring to FIG. 3, a front view of cable tensioner 100 is shown in accordance with an illustrative embodiment. Referring to FIG. 4, a left, front perspective view of cable tensioner 100 is shown in accordance with an illustrative embodiment. Referring to FIG. 5, a right, front perspective view of cable tensioner 100 is shown in accordance with an illustrative embodiment. Use of directional terms, such as top, bottom, right, left, front, back, etc. are merely intended to facilitate reference to the various surfaces and elements of the described structures relative to a front orientation applied to the orientation shown in FIG. 1 and are not intended to be limiting in any manner.

A cable terminator 103 may be mounted to cable tensioner 100. A cable 720 (shown referring to FIG. 7) may be mounted between cable terminator 103 and a cable mounting post 718 (shown referring to FIG. 7) in accordance with an illustrative embodiment. Cable tensioner 100 may include a compound screw 104, a spring nut 106, and a compression spring 108. Rotation of compound screw 104 increases or decreases a tension on cable 720 by adjusting a force exerted by compression spring 108 mounted between spring nut 106 and an anchor point of cable tensioner 100. The anchor point is on a body to which cable 720 is mounted such as actuator body 102. Compression spring 108 may be mounted directly or indirectly to the anchor point as discussed further below.

Cable 720 may include a wire, a rope, a cable, or other lengthwise tension element made of a metal material, an organic material such as a fiber, a plastic material, etc. Cable 720 extends between a first cable end 900 (shown referring to FIG. 9) and a second cable end 722 (shown referring to FIG. 7). First cable end 900 is connected to cable terminator 103 that is connected to cable tensioner 100. Second cable end 722 is connected to actuator body 102, but not directly to cable tensioner 100.

Cable 720 may be selected to have a low creep rate, high strength, high fatigue resistance, and/or high flex resistance based on a desired application. For example, depending on a maximum required tension, a working environment, a storage environment, and/or a lifetime requirement, stainless steel, tungsten, an ultra-high molecular weight polyethylene, a liquid crystal polymer, aromatic polyamide, a composite blend of a high modulus polyethylene material and a liquid crystal polymer, etc. may be used. In an illustrative embodiment, a Dyneema SK90 or SK99 cable with a diameter of approximately 1.5 millimeter (mm) is used.

Cable terminator 103 may include a terminator body 110. Terminator body 110 may include a terminator head 111 that protrudes from one end of terminator body 110 and has a larger cross-section in a front-back plane and/or in a top-bottom plane. In the illustrative embodiment, a terminator interior aperture surface 212 extends lengthwise through a portion of an interior of terminator body 110 and includes a terminator internal thread 206 mounted to terminator interior aperture surface 212 to extend inward away from terminator interior aperture surface 212.

In the illustrative embodiment, a terminator ring wall 210 defines an aperture through terminator body 110. Cable 720 may be inserted within terminator ring wall 210 to assist in anchoring cable 720 to cable terminator 103. Cable 720 may further be wrapped around a portion of terminator body 110 to assist in anchoring cable 720 to cable terminator 103.

In the illustrative embodiment, internal shaft 118 is a standard flat-tipped set screw that mates with terminator internal thread 206 and that also clamps first cable end 900 in place. First cable end 900 is pinched between a flat end of internal shaft 118 and an internal slot in terminator body 110. The clamping action allows for easy adjustment of a length of cable 720 and permits reuse of cable terminator 103 if cable 720 becomes worn and needs replacement. Cable 720 may be wrapped one or more times around terminator body 110 before exiting out through terminator ring wall 210. The one or more turns provide frictional forces that act to reduce an amount of tension that cable terminator 103 must resist. Tape may be wrapped around the one or more turns of cable 720 and terminator body 110 to help secure cable 720 and provide a neater appearance. Cable terminator 103 may be made of various materials suitable to the desired application including steel, stainless steel, aluminum, plastic, or other material depending on a maximum load on cable 720. For example, cable terminator 103 may be machined out of aluminum or injection molded plastic.

Compound screw 104 may include a screw head 112, an external shaft 114, and an internal shaft 118. Compound screw 104 may be made of various materials including steel, stainless steel, aluminum, plastic, or other material depending on a maximum load on cable 720 and the desired application. Screw head 112, external shaft 114, and internal shaft 118 may be formed of the same or different materials.

Screw head 112 is mounted to a first end of external shaft 114 to facilitate rotation of external shaft 114. Internal shaft 118 may be fixed to cable terminator 103 so that it does not rotate when screw head 112 is rotated. In the illustrative embodiment, screw head 112 has an hexagonal cross-section in a plane perpendicular to an axial length of compound screw 104 so that compound screw 104 can be rotated using a crescent wrench, a box wrench, a ratcheting box wrench, etc. Alternatively, screw head 112 may be a thumbscrew or knob that can be rotated by hand so that no external tools are needed.

External shaft 114 has a circular or cylindrical cross-section in the plane perpendicular to the axial length of compound screw 104. A first external thread 116 is mounted to an exterior of external shaft 114 to extend outward away from external shaft 114. In the illustrative embodiment, first external thread 116 extends lengthwise along external shaft 114.

An internal aperture surface 200 extends lengthwise through an interior of external shaft 114 and includes a first internal thread 202 mounted to internal aperture surface 200 to extend inward away from internal aperture surface 200. In the illustrative embodiment, internal aperture surface 200 extends lengthwise through at least a portion of screw head 112. In the illustrative embodiment, first internal thread 202 extends over a portion of internal aperture surface 200 at an end of external shaft 114 opposite screw head 112.

Internal shaft 118 has a circular or cylindrical cross-section in the plane perpendicular to the axial length of compound screw 104. Internal shaft 118 is sized and shaped to fit within internal aperture surface 200 of external shaft 114. A second external thread 120 is mounted to an exterior of internal shaft 118 to extend outward away from internal shaft 118. In the illustrative embodiment, second external thread 120 extends lengthwise along internal shaft 118.

Second external thread 120 of internal shaft 118 is shaped, sized and threaded in a complementary direction to mate with first internal thread 202 of external shaft 114 so that internal shaft 188 is threaded into or out of the interior of external shaft 114 by rotation of screw head 112. Second external thread 120 of internal shaft 118 is further shaped, sized and threaded in a complementary direction to mate with terminator internal thread 206 of terminator body 110 so that second external thread 120 is threaded into terminator body 110 clamping first cable end 900 and fixing internal shaft 118 to terminator body 110.

First external thread 116 is threaded in an opposite direction relative to second external thread 120. For example, in an illustrative embodiment, first external thread 116 is left-handed, and second external thread 120 is right-handed so that a clockwise rotation of screw head 112 increases a tension of cable 720, and a counterclockwise rotation of screw head 112 decreases a tension of cable 720.

Spring nut 106 may include a flange 122 and a nut body 124. Flange 122 may have a front face 126 and a back face 128. Front face 126 is closest to screw head 112 when compound screw 104 is mounted to spring nut 106. Back face 128 is on an opposite side of flange 122 relative to front face 126. Nut body 124 extends perpendicularly from back face 128. Flange 122 may have a circular, cylindrical, or polygonal cross-section in a plane perpendicular to an axial length of nut body 124. Nut body 124 may have a circular, cylindrical, or polygonal cross-section in the plane perpendicular to the axial length of nut body 124. A cross-section of back face 128 is larger than a cross-section of nut body 124.

A nut aperture surface 203 extends lengthwise through an interior of flange 122 and an interior of nut body 124 and includes a second internal thread 204 mounted to nut aperture surface 203 to extend inward away from nut aperture surface 203. Second internal thread 204 of spring nut 106 is shaped, sized and threaded in a complementary direction to mate with first external thread 116 of external shaft 114 so that external shaft 114 is threaded into or out of the interior of spring nut 106 by rotation of screw head 112.

Spring nut 106 may be made of various materials suitable to the desired application including steel, stainless steel, aluminum, plastic, or other material depending on a maximum load on cable 720. Second internal thread 204 may have a non-standard thread or include a plastic locking insert to increase a thread friction that can help advance spring nut 106 along compound screw 104 when a ratcheting driver is used even when cable 720 is at a low or zero tension. For example, second internal thread 204 may have a thread pitch slightly larger than a thread pitch of first external thread 116 to ensure there is significant friction between spring nut 106 and compound screw 104. An interface between first external thread 116 and second internal thread 204 may also be lubricated to adjust a friction level and reduce wear and corrosion.

Compression spring 108 may include a plurality of coils formed between a first spring end 500 and a second spring end 300 to provide resistance to a compressive force applied axially. Compression spring 108 is mounted so that the plurality of coils surrounds an axial length of nut body 124, of external shaft 114, and optionally of a portion of internal shaft 118. The cross-section of back face 128 is larger than an outer diameter of compression spring 108 so that first spring end 500 abuts back face 128 of flange 122 to help keep compression spring 108 in place and prevent buckling.

Second spring end 300 abuts the anchor point of cable tensioner 100 relative to actuator body 102. For example, in the illustrative embodiment of FIGS. 1 through 5, the anchor point is an anchor wall 214 of actuator body 102.

The anchor point may include a cross-section that is slightly larger than an outer diameter of second spring end 300 to help keep compression spring 108 in place and prevent buckling. Alternatively, a protrusion on actuator body 102 that is slightly smaller than an internal diameter of compression spring 108 may extend inside compression spring 108 for the same purpose. Compression spring 108 may be held in place axially by the cable tension or first spring end 500 and/or second spring end 300 may be bonded or attached to spring nut 106 and/or the anchor point such as anchor wall 214.

Compression spring 108 may be selected to provide a maximum load that is greater than a largest desired cable tension. A precision compression spring 108 with closed and ground ends may be used in an illustrative embodiment to provide a more accurate length and spring rate and minimize a risk of buckling. Given a maximum load, the spring rate determines a tension drop resulting from elongation of cable 720. For example, assuming a spring rate of 5 newtons/mm (N/mm), if there is combined cable bedding in and creep of 1 mm, the tension drops by 5 N. In contrast, for a spring rate of 10 N/mm, the same 1 mm bedding in and creep results in a 10 N drop in tension. However, for a given maximum load, the 10 N/mm spring is shorter than the 5 N/mm spring, which may result in a more compact cable tensioner 100. Selection of compression spring 108 may balance a tradeoff between a low spring rate that minimizes a tension change from cable elongation, and a high spring rate that provides a more compact cable tensioner 100.

A maximum allowable drop in cable tension, $t_{max}$, and a maximum expected cable elongation, $d_{max}$, can be used to determine a maximum spring rate, $k_{max}$, for example, using $k_{max}=t_{max}/d_{max}$ Selection of compression spring 108 with a lowest spring rate that does not enlarge compression spring 108 beyond an available space may be chosen.

In an illustrative embodiment, spring nut 106 is made of a material that is compatible with the material used to make compound screw 104 and compression spring 108 to avoid galvanic corrosion and fretting. For example, a music wire spring and steel compound screw may be used with an acetal spring nut.

Spring nut 106 and cable terminator 103 may be prevented from rotating when screw head 112 is rotated by mounting them in a slot or adjacent to a fixed structure that limits their rotation or by a user grasping them while rotating screw head 112 to adjust the tension on cable 720. For example, flange 122 and terminator head 111 may be shaped to fit in a slot formed in actuator body 102 or to fit within a space defined by actuator body 102 that limits their rotation.

Rotating screw head 112 by a complete turn changes a position of spring nut 104 relative to cable terminator 103 by a distance of $P_i+P_o$, where $P_i$ is an inner thread pitch of second external thread 120, and $P_o$ is an outer thread pitch of first external thread 116. Compound screw 104 provides a given tension adjustment with fewer turns of screw head 112 compared to use of either thread alone.

Cable tensioner 100 may be self-locking. However, for low-friction materials, high lead angle threads, or high vibration applications, a jam nut can be added to first external thread 116 to lock spring nut 104 in place relative to external shaft 114 once tensioning is complete.

Referring to FIG. 2, actuator body 102 may include an alignment wall 130 that is a flat surface of actuator body 102 above which spring nut 106 is mounted and on which a tension indicator 208 is formed. Tension indicator 208 includes a tension scale that is aligned axially with external shaft 114. In the illustrative embodiment, an edge of back face 128 is flat and is parallel to and aligned with a mark on the tension scale of tension indicator 208.

The tension scale of tension indicator 208 includes a series of spaced apart marks. Typically, the marks are equally spaced apart though this is not required and may be based on the scale presented. Associated with one or more of the marks are a tension value indicator. For example, in the illustrative embodiment, tension indicator 208 includes seven linear marks that extend parallel to back face 128. Associated with each mark is a tension value indicator. For example, a first mark is associated with a tension value of zero as represented by a "0" tension value indicator; a second mark is associated with a tension value of 20 N as represented by a "20" tension value indicator; a third mark is associated with a tension value of 40 N as represented by a "40" tension value indicator; a fourth mark is associated with a tension value of 60 N as represented by a "60" tension value indicator; a fifth mark is associated with a tension value of 80 N as represented by an "80" tension value indicator; a sixth mark is associated with a tension value of 100 N as represented by a "100" tension value indicator; and a seventh mark is associated with a tension value of 120 N as represented by a "120" tension value indicator.

When screw head 112 is rotated, back face 128 of flange 122 is translated along external shaft 114 to show a current tension value. In the illustrative embodiment with first external thread 116 left-handed and second external thread 120 right-handed, the translation may be to the right in the orientation shown in FIG. 2 when screw head 112 is rotated clockwise. In the illustrative embodiment with first external thread 116 left-handed and second external thread 120 right-handed, the translation may be to the left in the orientation shown in FIG. 2 when screw head 112 is rotated counterclockwise.

In an alternative embodiment, other edges, such as an edge of front face 126 of flange 122, may be used to indicate the current tension value based on the edge alignment with tension indicator 208. As another option, a tension mark 608, such as an integral cutout or protrusion created on flange 122 or on second flange 122a during a manufacturing process, may be provided on a surface of spring nut 106 to indicate the current tension value based on the tension mark alignment with tension indicator 208. As still another option, a tension mark may be formed on a separate component. The tension scale of tension indicator 208 may be mounted to another part that does not move axially.

The tension scale may indicate the tension in standard units (Newtons, pounds-force, kilograms-force, etc.), as a percentage of some reference value (e.g. 20/40/80/100/120% of a recommended tension), or using multiple application-specific settings (e.g. tension levels recommended for shipping, extended storage, light load, heavy load, etc.). The tension scale may also be a separate part attached to actuator body 102 so that it may be customized or replaced for different applications or device variation.

Figure 6:
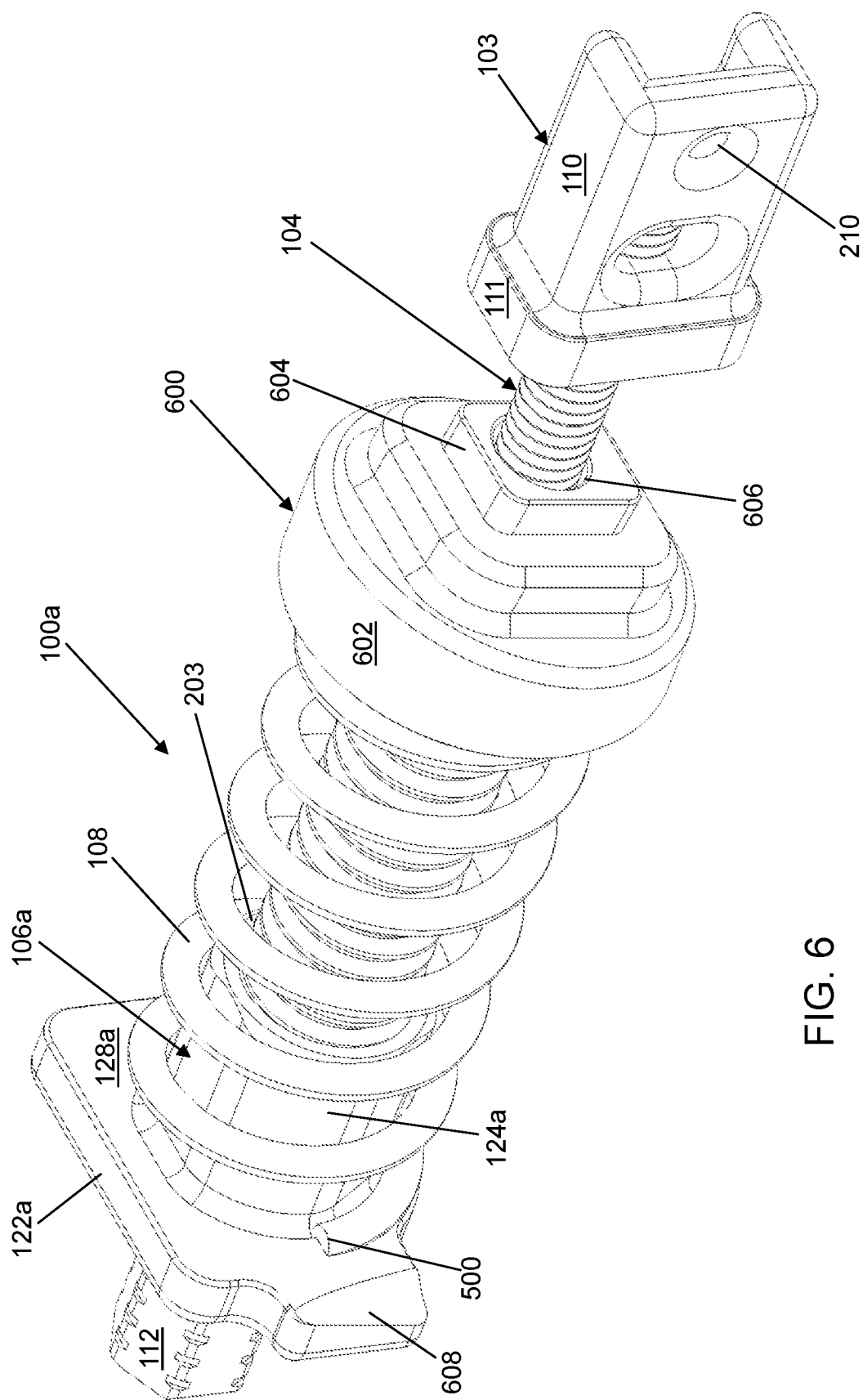
FIG. 6 depicts a right, front perspective view of the cable tensioner of FIG. 1 with a spring cup in accordance with an illustrative embodiment.

Referring to FIG. 6, a right, front perspective view of a second cable tensioner 100a is shown in accordance with an illustrative embodiment. Second cable tensioner 100a is similar to cable tensioner 100, but includes a second spring nut 106a and a spring cup 600 along with compound screw 104 and compression spring 108. Second spring nut 106a may include a second flange 122a and a second nut body 124a. Second flange 122a may include a second front face 126a (shown referring to FIG. 12) and a second back face 128a. Second flange 122a includes a bottom protrusion from its rectangular body. Second nut body 124a includes three flats spaced at 120 degrees to simplify fixturing the part during manufacturing.

Spring cup 600 is mounted between second spring nut 106a and cable terminator 103. Spring cup may include a cup body 602 and a cup head 604. A cup interior surface 606 extends lengthwise through an interior of cup head 604 and is sized and shaped to accommodate internal shaft 118 and second external thread 120 therethrough.

Second spring end 300 fits within and abuts interior surface 902. Cup body 602 and/or cup head 604 may be sized and shaped to fit in a slot, such as a slot 740 (shown referring to FIG. 7) formed in a second actuator body 102a so that spring cup 600 does not rotate with screw head 112 or translate axially thereby acting as the anchor point of second cable tensioner 100a relative to second actuator body 102a.

Figure 7:
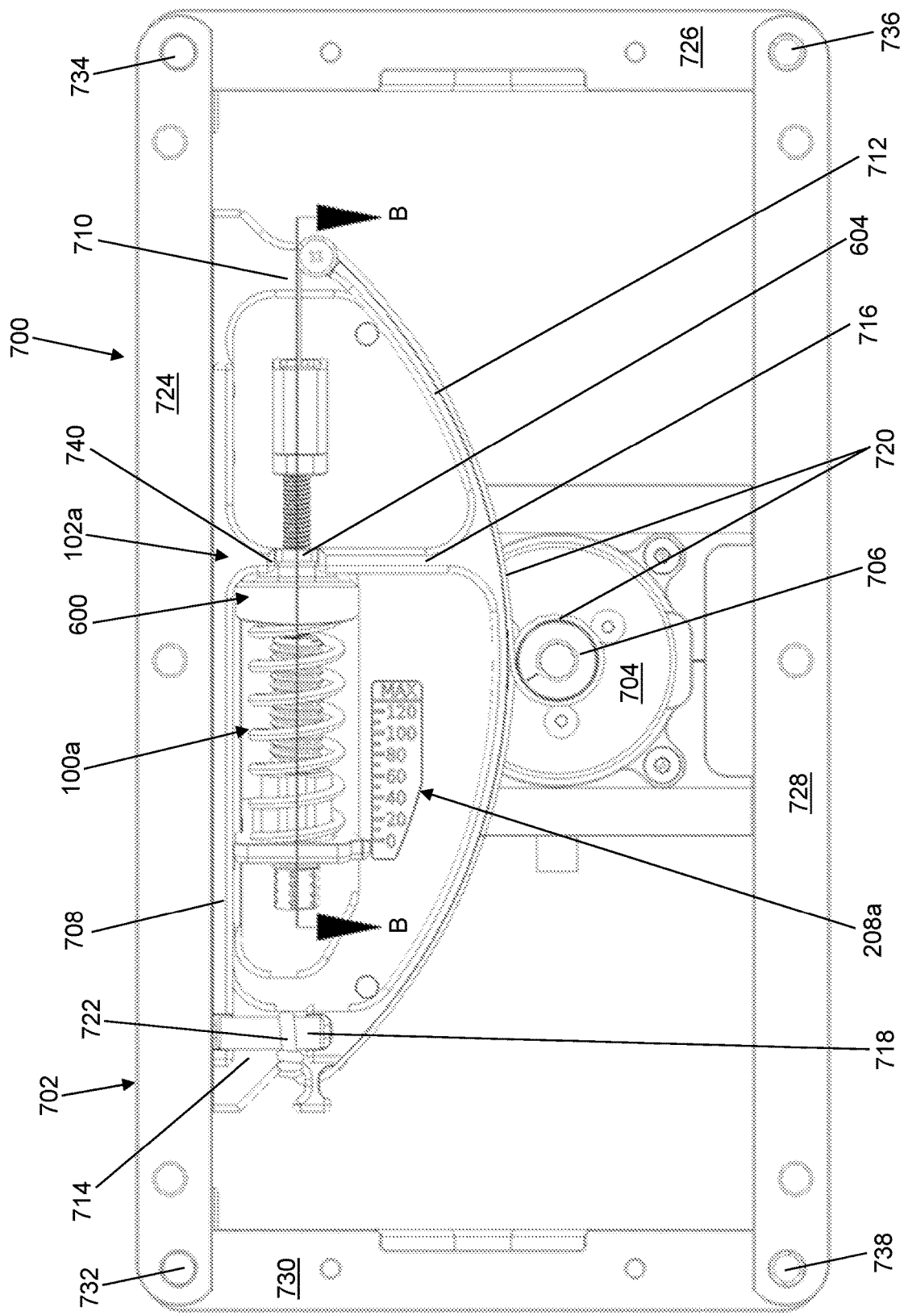
FIG. 7 depicts a front view of the cable tensioner of FIG. 6 mounted to an actuator in accordance with an illustrative embodiment.

Referring to FIG. 7, a front view of second cable tensioner 100a is shown mounted to an actuator 700 in accordance with an illustrative embodiment. In the illustrative embodiment of FIG. 7, second cable tensioner 100a is shown mounted to second actuator body 102a, which may be a fixed or a moving component of a mechanism such as actuator 700. Cable tensioner 100 may similarly be mounted to second actuator body 102a. Cable tensioner 100 and second cable tensioner 100a may be mounted to other types of devices that use a tensioning device to set a tension on a cable. Thus, actuator 700 is merely illustrative. In the illustrative embodiment, actuator 700 is a parallelogram linkage actuator, and second actuator body 102a is an output pulley of second actuator body 102a. For example, parallelogram linkage actuators are described in U.S. Pat. Nos. 8,464,603 and 8,931,359.

Actuator 700 may include parallelogram linkage 702, a motor 704, and second actuator body 102a. A shaft 706 is mounted to extend from motor 704 and is rotated under control of motor 704. Cable 720 is wound one or more times around shaft 706 so that cable 720 translates as shaft 706 rotates. A centered position of actuator 700 is shown in FIG. 7. A middle portion of cable 720 may also be fixed to shaft 706 to help prevent cable 720 from slipping on shaft 706. Cable 720 may be fixed to shaft 706 using adhesive or a fastener, or by fitting a knot in a middle portion of cable 720 or object mounted to a middle portion of cable 720 into a detent or pocket in shaft 720. Alternatively, cable 720 may comprise two cable segments, each with one end fixed to shaft 706.

Parallelogram linkage 702 may include a translating link 724, a right link 726, a bottom link 728, a left link 730, a first joint 732, a second joint 734, a third joint 736, and a fourth joint 738. Translating link 724, right link 726, bottom link 728, and left link 730 form the parallelogram linkage. First joint 732 is a rotational joint mounted between translating link 724 and left link 730. Second joint 734 is a rotational joint mounted between translating link 724 and right link 726. Third joint 736 is a rotational joint mounted between right link 726 and bottom link 728. Fourth joint 738 is a rotational joint mounted between left link 730 and bottom link 728.

Translating link 724 can be controlled to translate left or right under control of motor 704, for example, as described in U.S. Pat. Nos. 8,464,603 and 8,931,359. For example, referring to FIG. 10, a simplified front view of parallelogram linkage 702 with second actuator body 102a translated to the right by rotation of shaft 706 under control of motor 704 is shown in accordance with an illustrative embodiment. Referring to FIG. 11, a simplified front view of parallelogram linkage 702 with second actuator body 102a translated to the left by rotation of shaft 706 under control of motor 704 is shown in accordance with an illustrative embodiment.

Second actuator body 102a may include a top wall 708, a right wall 710, an arced wall 712, a left wall 714, and a tensioner mounting wall 716. Second actuator body 102a may include a fewer or a greater number of walls. Top wall 708 is mounted to extend downwards from translating link 724. Arced wall 712 forms an arc between right side wall 710 and left wall 714 that extend downwards from translating link 724. Top wall 708 is mounted between right side wall 710 and left wall 714. Tensioner mounting wall 716 extends downward from top wall 708 between top wall 708 and arced wall 712. Slot 740 is formed in tensioner mounting wall 716 and is sized and shaped to hold cup head 604 so that spring cup 600 does not translate or rotate and properly aligns compression spring 108 with the remaining components of second cable tensioner 100a. A second tension indicator 208a is formed on a surface of second actuator body 102a.

Cable mounting post 718 mounts to and extends downward from translating link 724. In the illustrative embodiment, cable mounting post 718 is a dowel pin that fits into a slot on translating link 724. Second cable end 722 is mounted to cable mounting post 718. Second cable end 722 is typically fixed to actuator body 102 or second actuator body 102a after wrapping around a motor drive pinion or other drive element such as shaft 706. Second cable end 722 may include a knot, may be tied around a pin such as cable mounting post 718, or have an object attached to it using a crimp or adhesive. Alternatively, second actuator body 102a may include a feature that clamps second cable end 722.

Figure 8:
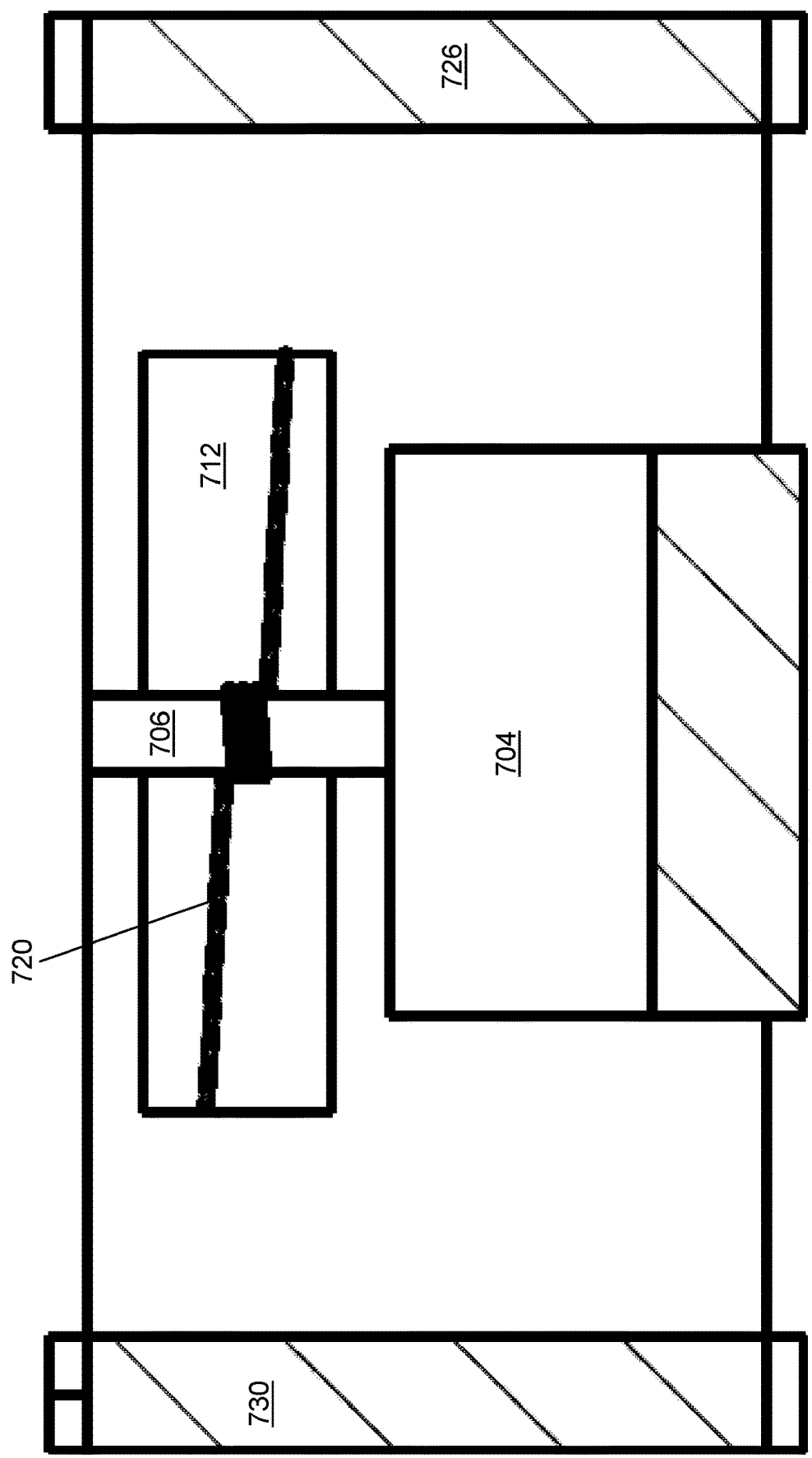
FIG. 8 depicts a bottom view of the cable tensioner of FIG. 6 mounted to the actuator in accordance with an illustrative embodiment.
Figure 9:
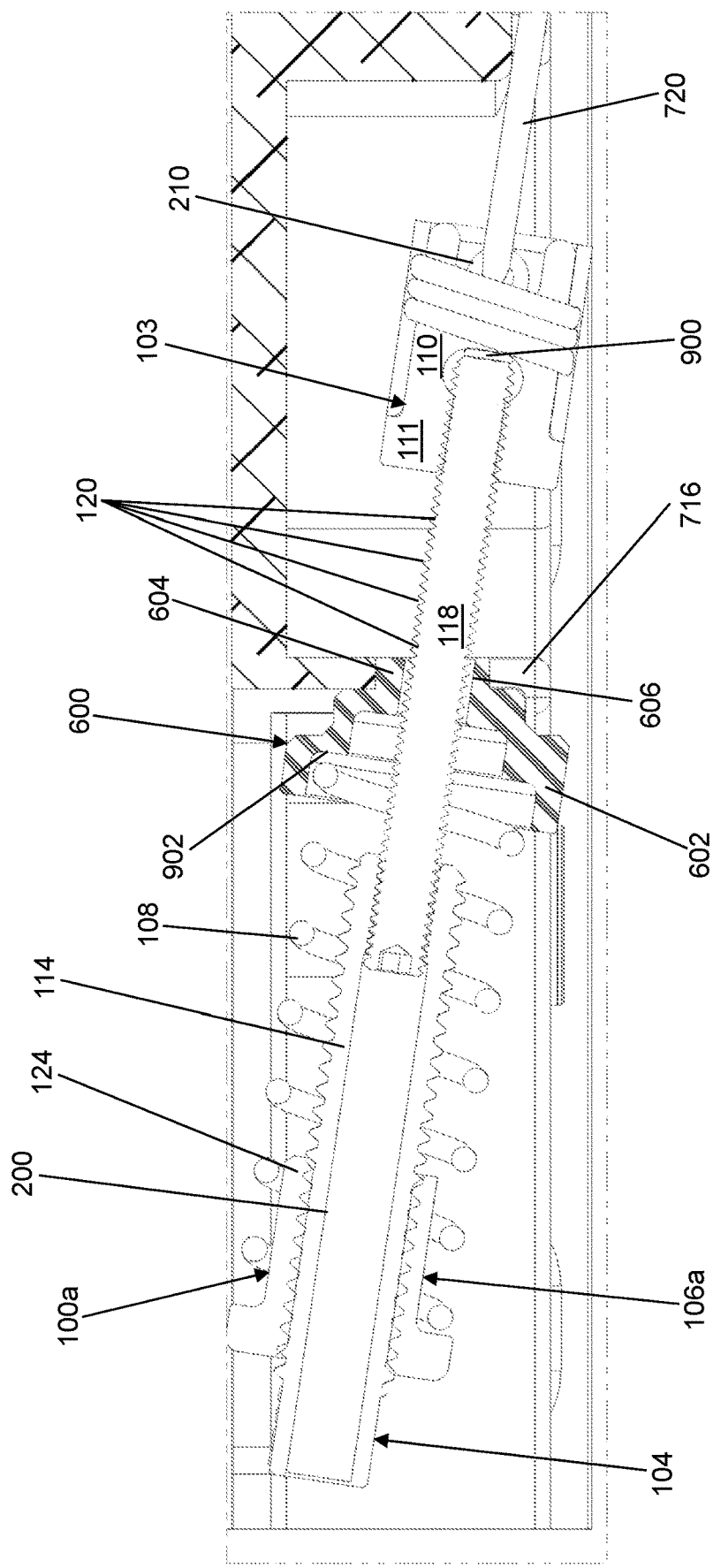
FIG. 9 depicts a top cross-sectional view of the cable tensioner of FIG. 6 mounted to the actuator in accordance with an illustrative embodiment.
Figure 12:
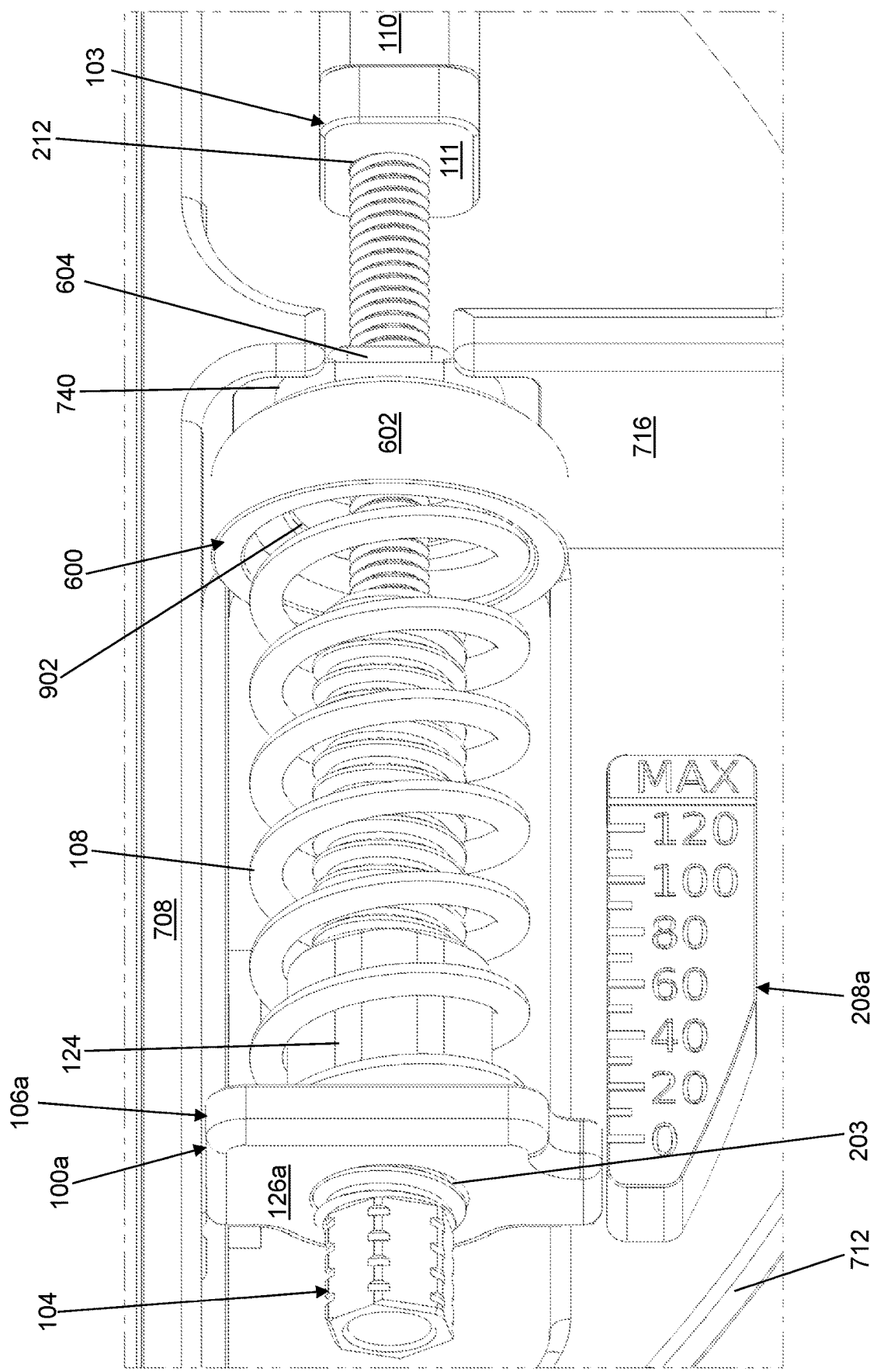
FIG. 12 depicts a zoomed left, front perspective view of the cable tensioner of FIG. 6 mounted to the actuator in accordance with an illustrative embodiment.
Figure 13:
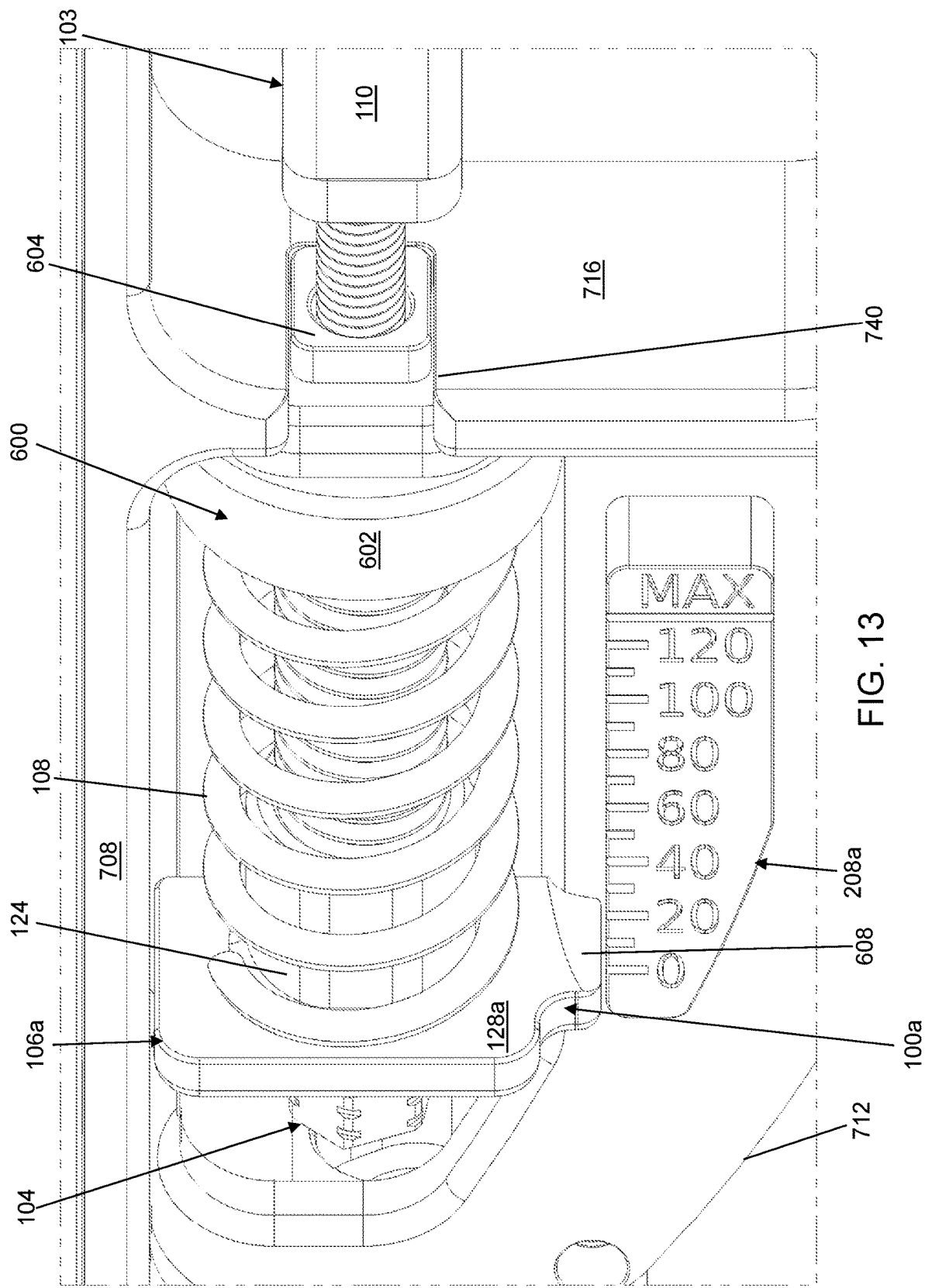
FIG. 13 depicts a zoomed right, front perspective view of the cable tensioner of FIG. 6 mounted to the actuator in accordance with an illustrative embodiment.
Figure 14:
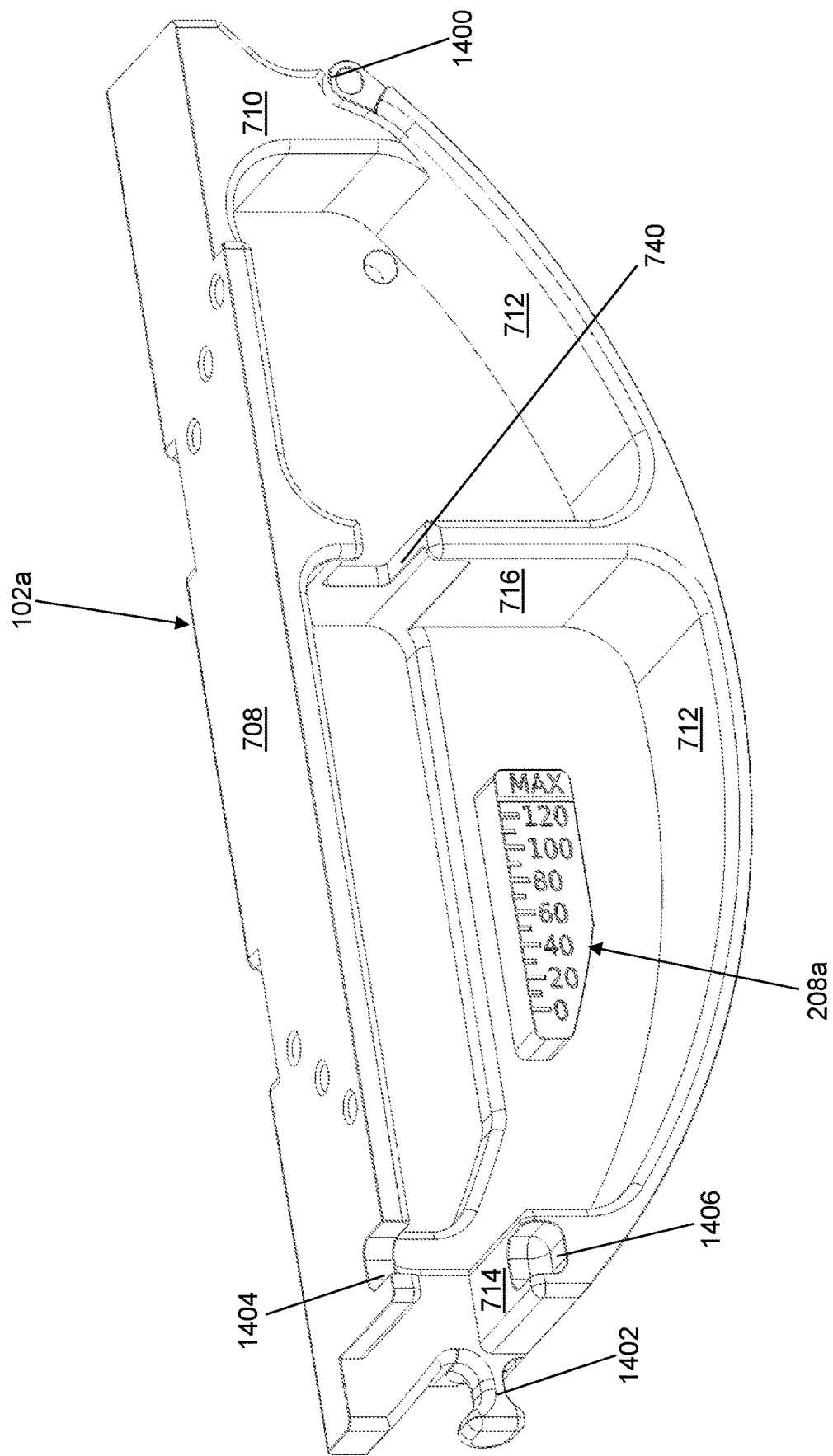
FIG. 14 depicts a left, front perspective view of a second actuator body of the actuator of FIG. 7 in accordance with an illustrative embodiment.

Referring to FIG. 8, a bottom view of second cable tensioner 100a is shown mounted to second actuator body 102a in accordance with an illustrative embodiment. Referring to FIG. 9, a top cross-sectional view of second cable tensioner 100a is shown mounted to second actuator body 102a in accordance with an illustrative embodiment. The top cross-sectional view of cable tensioner 100 is along a plane B-B shown with reference to FIG. 7. Referring to FIG. 12, a zoomed left, front perspective view of second cable tensioner 100a is shown mounted to second actuator body 102a in accordance with an illustrative embodiment. Referring to FIG. 13, a zoomed right, front perspective view of second cable tensioner 100a is shown mounted to second actuator body 102a in accordance with an illustrative embodiment. Referring to FIG. 14, a left, front perspective view of second actuator body 102a is shown in accordance with an illustrative embodiment.

Cable 720 may be wrapped along a circular protrusion 1400 of arced wall 712, along arced wall 712, and behind a knob 1402 before being wrapped around cable mounting post 718. A cradle may be formed by a notch 1404 formed in top wall 708 and a pocket 1406 within which cable mounting post 718 is mounted. There is some friction between cable 720 and circular protrusion 1400 and between cable 720 and knob 1402 that may make the tension measurement somewhat less than a true cable tension. Alternatively, circular protrusion 1400 and knob 1402 may include low friction bushings or ball bearings that allow them to freely rotate to minimize the friction and allow a more accurate tension measurement. As another option, cable 720 could be wrapped around circular protrusion 1400 and/or knob 1402 by one or more full turns. From the well-known capstan equation, the friction from one or more of the wraps around circular protrusion 1400 and/or knob 1402 may shield cable tensioner 100 and/or cable mounting post 718 from much of the tension of cable 720, allowing smaller or lighter duty components to be used. Also, wrapping cable 720 by one or more turns around knob 1402 produces an automatic tensioning behavior.

Second cable tensioner 100a is mounted at an angle of approximately 8.5 degrees into the page to limit an amount that second cable tensioner 100a protrudes. A bore defined by interior surface 902 of cup body 602 is similarly angled relative to cup head 604 to permit assembly of second cable tensioner 100a at the proper angle.

In the illustrative embodiment, the tension scale of second tension indicator 208a is engraved directly on a raised portion of second actuator body 102a. The scale markings are closer together by a factor of cos(8.5) than they would be if second cable tensioner 100a and the tension scale were aligned. Alternatively, the scale could be manufactured or installed at an 8.5 degree angle, making the cosine correction unnecessary.

To install cable 720 and second cable tensioner 100a, second cable end 722 of cable 720 is tied to cable mounting post 718. Cable 720 is wrapped around knob 1402, along arced surface 712, and around shaft 706 that may be referred to as a drive pinion. Cable 720 is wrapped several times around shaft 706 as shown referring to FIG. 8. Cable 720 is mounted along a remainder of arced surface 712, through terminator ring wall 210, wrapped around terminator body 110 several times and pulled tight through a slot in a middle of terminator body 110. Internal shaft 118 is threaded into terminator internal thread 206 of cable terminator 103 and tightened, clamping first cable end 900 in the slot in terminator body 110. Internal shaft 118 is inserted through spring cup 600, and external shaft 114 is threaded onto second external thread 120 of internal shaft 118. Second cable end 300 of compression spring 108 is inserted into interior surface 902 of cup body 602. Spring nut 106 is threaded onto first external thread 116 of external shaft 114 so that second back face 128a abuts first spring end 500 of compression spring 108.

At this time, second cable tensioner 100a is in its retracted position, with spring nut 106 near screw head 112. While pulling cable 720 taut, second cable tensioner 100a with cable terminator 103 and spring cup 600 are lowered into slot 740 of second actuator body 102a. Cup head 604 mates with slot 740. In a preferred embodiment, a length of cable 720 is chosen such that compression spring 108 deflects slightly during insertion into slot 740, with spring cup 600 "snapping" into place once fully inserted. Given the complex geometry of the cable routing, the preferred cable length may be determined experimentally.

A ratcheting box wrench is inserted over screw head 112 and pivoted repeatedly to rotate external shaft 114, which compresses compression spring 108 and increases the tension on cable 720. The tension may be increased in several steps before reaching a final tension. At each step, actuator 700 may be moved one or more times through its range of motion to hasten a cable "bedding-in" process. If a new cable 720 is being installed, a final tensioning step may use a somewhat higher tension than a desired long-term operating tension to allow for some additional "bedding-in" during initial use of actuator 700, which will increase the effective cable length and decrease the tension down to the desired long-term level.

Cable tensioner 100 and second cable tensioner 100a provide direct reading of the cable tension without the need for tension meters or torque wrench tools, minimizing tool cost and enabling easy field inspection and service. Cable tensioner 100 and second cable tensioner 100a allow the initial tension to be set to pre-determined or application specific levels that may balance tradeoffs between load capability and cable wear. Cable tensioner 100 and second cable tensioner 100a also allow adjustment to compensate for the cable lengthening due to "bedding-in" after initial use and creep over extended use. Cable tensioner 100 and second cable tensioner 100a also allow adjustment of the tension to a lower level for storage or shipping to minimize creep or internal forces. Cable tensioner 100 and second cable tensioner 100a allow an overlap of compression spring 108 and the threads of compound screw 104 enabling a shorter overall length. With compression spring 108 on the outside of the other components, larger diameter springs can be selected, allowing for large maximum tension levels despite the compact size.

Figure 15:
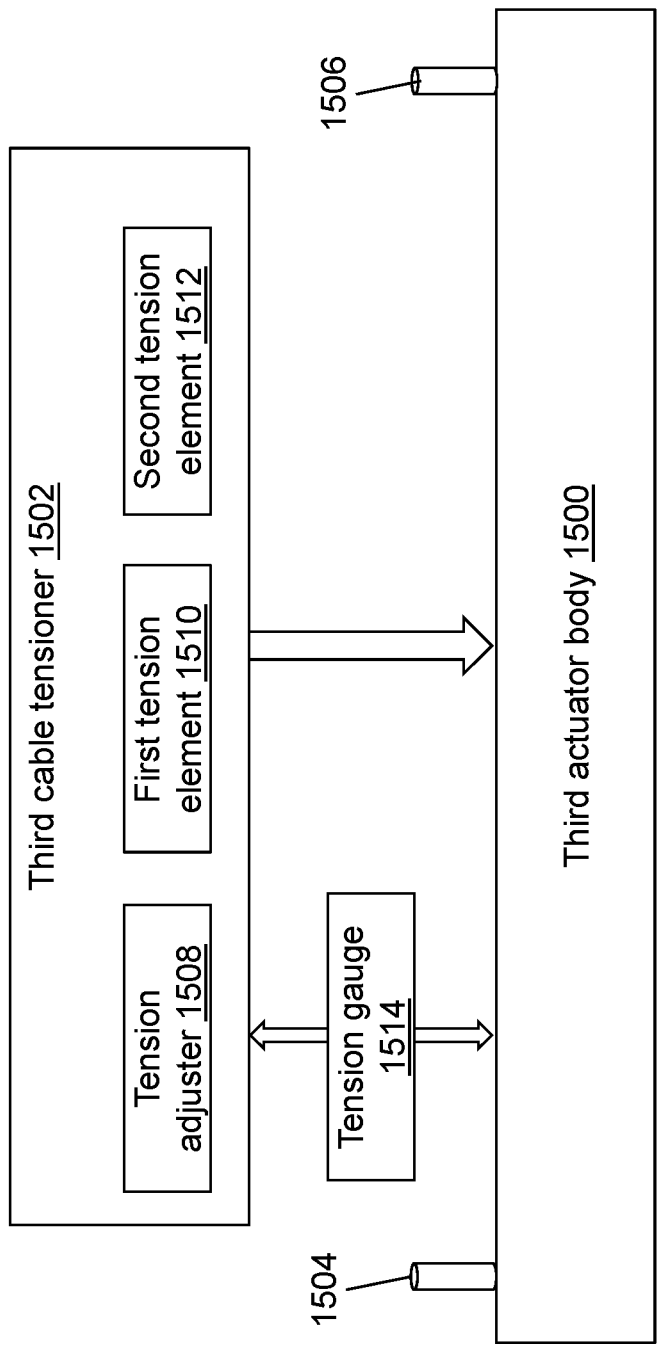
FIG. 15 depicts a block diagram of a third actuator body and a third cable tensioner in accordance with an illustrative embodiment.

Referring to FIG. 15, a block diagram of a third actuator body 1500 and a third cable tensioner 1502 is shown in accordance with an illustrative embodiment. Actuator body 102 and second actuator body 102a are illustrative examples of third actuator body 1500. A first anchor body 1504 and a second anchor body 1506 are mounted to or on third actuator body 1500. For example, anchor wall 214 and slot 740 are illustrative examples of first anchor body 1504, and cable mounting post 718 is an illustrative example of second anchor body 1506. First anchor body 1504 and second anchor body 1506 may be mounted anywhere on third actuator body 1500 and may have various constructions. First anchor body 1504 and/or second anchor body 1506 may include structural features that constrain rotation such as being formed as a slot, a protrusion, a linear guide, etc. First anchor body 1504 and/or second anchor body 1506 may include structural features that enable rotation such as being formed as a swivel, a bearing, a compound screw, etc.

Third cable tensioner 1502 mounts to third actuator body 1500 at first anchor body 1504 and at second anchor body 1506. Third cable tensioner 1502 may further mount to third actuator body 1500 at additional anchor points. Third cable tensioner 1502 may include a tension adjuster 1508, a first tension element 1510, and a second tension element 1512. Cable tensioner 100 and second cable tensioner 100a are illustrative examples of third cable tensioner 1502. Spring nut 106 mounted to compound screw 104 is an illustrative example of tension adjuster 1508. Compound screw 104 may be replaced with a turnbuckle, a split motor pinion, a locking cable takeup reel, etc. Compression spring 108 is an illustrative example of first tension element 1510. First tension element 1510 may further include, an extension spring, a torsional spring, a leaf spring, etc. Cable 720 is an illustrative example of second tension element 1512. First tension element 1510 has a lower stiffness than second tension element 1512. Though in the illustrative embodiments, third cable tensioner 1502 includes components that are co-located and concentric, this is not required.

Tension gauge 1514 may mount to either third actuator body 1500 or third cable tensioner 1502. Tension indicator 208 and second tension indicator 208a are illustrative examples of tension gauge 1514. Tension gauge 1514 indicates a measure of a displacement of first tension element 1510 and/or of a portion of second tension element 1512. From the well-known Hooke's law, the force of the tension element may be computed as a product of a measured deflection and a known stiffness of the tension element. A marker of tension gauge 1514 may be connected to one end of first tension element 1510 and a scale of tension gauge 1514 may be connected to an opposite end of first tension element 1510. When tension gauge 1514 also measures a displacement of the portion of second tension element 1512, the force of the tension elements may be computed as a product of the equivalent series stiffness $k_s$ of the tension elements and the sum of the displacements of the measured portions of the tension elements. The equivalent series stiffness $k_s$ of the tension elements is computed by $$\frac{1}{k_s} = \frac{1}{k_1} + \frac{1}{k_2},$$

where $k_1$ is the stiffness of first tension element and $k_2$ is the stiffness of the measured portion of the second tension element. The tension scale of tension indicator 208 may indicate the measured displacement or the corresponding tension of second tension element 1512, which is computed as the product of the measured displacement and the appropriate stiffness value.

Though described as including multiple portions mounted to each other, components described herein may be formed of a single continuous piece of material, for example, by molding, or may be formed of multiple distinct pieces mounted together, for example, attached to each other using various fasteners including adhesives, screws, rivets, etc.

As used in this disclosure, the term "mount" is intended to define a structural connection between two or more elements and includes join, unite, connect, couple, associate, insert, hang, hold, affix, attach, fasten, bind, paste, secure, bolt, screw, rivet, solder, weld, glue, adhere, form over, layer, and other similar terms. The phrases "mounted on" and "mounted to" include any interior or exterior portion of the elements referenced. These phrases also encompass direct mounting in which the referenced elements are in direct contact and indirect mounting in which the referenced elements are not in direct contact but are connected via one or more intermediate elements. Elements referenced as mounted to each other herein may further be integrally formed together, for example, using a molding process as understood by a person of skill in the art. As a result, elements described herein as being mounted to each other need not be discrete structural elements.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. An actuator comprising:
   a motor;
   a shaft mounted to the motor for rotation under control of the motor;
   an actuator body comprising a first anchor body and a second anchor body, wherein, when the shaft is rotated under control of the motor, the actuator body and the motor move relative to each other under control of the motor;
   a first tension element mounted to encircle the shaft, the first tension element comprising a first end and a second end, wherein the second end is opposite the first end, wherein the first end of the first tension element is mounted to the first anchor body of the actuator body;
   a cable tensioner mounted to the second anchor body of the actuator body, the cable tensioner comprising:
      a tension adjuster;
      a second tension element mounted to the tension adjuster, the second tension element comprising a third end and a fourth end, wherein the fourth end is opposite the third end; and
      a tension element terminator, wherein the second end of the first tension element is mounted to the tension element terminator; and
   a tension gauge mounted adjacent the tension adjuster to indicate a tension of the first tension element.

2. The actuator of claim 1, wherein the tension further includes an internal force of the second tension element.

3. The actuator of claim 1, wherein the tension gauge is mounted to the actuator body.

4. The actuator of claim 3, wherein the tension gauge comprises:
   a tension indicator mounted to the actuator body, the tension indicator comprising a tension scale,
   wherein a portion of the tension adjuster is aligned with a mark on the tension scale to indicate a tension applied to the first tension element.

5. The actuator of claim 1, wherein the tension gauge comprises:
   a tension indicator mounted adjacent the second tension element, the tension indicator comprising a tension scale; and a tension mark mounted to the fourth end of the second tension element,
wherein a portion of the tension mark is aligned with a mark on the tension scale to indicate a tension applied to the first tension element.

6. The actuator of claim 1, wherein the tension element terminator is mounted to the tension adjuster, the fourth end of the second tension element is mounted to the tension adjuster, and the third end of the second tension element is mounted to the second anchor body of the actuator body.

7. The actuator of claim 1, wherein the tension element terminator is mounted to the tension adjuster with the second tension element mounted axially between the tension element terminator and the tension adjuster.

8. The actuator of claim 1, wherein the actuator body comprises an arced surface and a translating link, wherein the first tension element is mounted to extend along the arced surface, wherein, when the shaft is rotated under control of the motor, the translating link is translated.

9. The actuator of claim 1, wherein the first tension element is a cable, wherein neither the first end nor the second end of the cable is connected to the shaft.

10. The actuator of claim 1, wherein the first anchor body is a mounting post mounted to the actuator body.

11. The actuator of claim 1, wherein the second anchor body is a slot formed in a wall of the actuator body.

12. The actuator of claim 1, wherein the second anchor body is a wall of the actuator body.

13. The actuator of claim 1, wherein the second tension element is a spring.

14. An actuator comprising:
a motor;
a shaft mounted to the motor for rotation under control of the motor;
an actuator body comprising a first anchor body and a second anchor body;
a first tension element mounted to encircle the shaft, the first tension element comprising a first end and a second end, wherein the second end is opposite the first end, wherein the first end of the first tension element is mounted to the first anchor body of the actuator body;
a cable tensioner mounted to the second anchor body of the actuator body, the cable tensioner comprising:
a tension adjuster comprising:
a compound screw comprising:
an external shaft;
an internal shaft;
an interior aperture surface that extends lengthwise through an interior of the external shaft;
a first external thread mounted to at least a portion of an exterior of the external shaft to extend outward from the external shaft;
a first internal thread mounted to at least a portion of the interior aperture surface to extend inward away from the interior aperture surface; and
a second external thread mounted to an exterior of the internal shaft to extend outward from the internal shaft, wherein the first internal thread is mated with the second external thread; and
a spring nut comprising:
a flange;
a nut body mounted to a first face of the flange to extend outward from the first face of the flange;
a nut interior aperture surface that extends lengthwise through an interior of the flange and an interior of the nut body; and
a second internal thread mounted to the nut interior aperture surface to extend inward away from the nut interior aperture surface, wherein the second internal thread is mated with the first external thread;
a second tension element mounted to the tension adjuster, the second tension element comprising a third end and a fourth end, wherein the fourth end is opposite the third end; and
a tension element terminator, wherein the second end of the first tension element is mounted to the tension element terminator; and
a tension gauge mounted adjacent the tension adjuster to indicate a tension of the first tension element.

15. The actuator of claim 14, wherein the second tension element is a spring comprising a plurality of coils between the third end and the fourth end, wherein the fourth end abuts the first face of the flange and encircles an exterior surface of the nut body.

16. The actuator of claim 14, wherein the tension element terminator comprises:
a terminator body;
a terminator interior aperture surface that extends lengthwise through at least a portion of an interior of the terminator body; and
a third internal thread mounted to the terminator interior aperture surface to extend inward away from the terminator interior aperture surface,
wherein the third internal thread is configured to mate with the second external thread.

17. The actuator of claim 16, wherein the first tension element is mounted between a portion of the terminator body and the first anchor body.

18. The actuator of claim 14, wherein the second tension element is mounted between the first face of the flange and the second anchor body.

19. The actuator of claim 14, wherein the flange is mounted to translate axially in a direction parallel to the external shaft when the external shaft is rotated.

20. The actuator of claim 14, further comprising:
a spring cup comprising a cup body that forms a concave cavity defined by an interior surface,
wherein the third end of the first tension element is configured to fit within the concave cavity defined by the interior surface of the cup body.

* * * * *